W. HUMPHREY.
DRY PIPE VALVE AND SIGNAL.
APPLICATION FILED FEB. 23, 1916.

1,211,709.

Patented Jan. 9, 1917.
2 SHEETS—SHEET 1.

Inventor
William Humphrey.
By his Attorney
Oscar Geier

UNITED STATES PATENT OFFICE.

WILLIAM HUMPHREY, OF NEW YORK, N. Y.

DRY-PIPE VALVE AND SIGNAL.

1,211,709. Specification of Letters Patent. Patented Jan. 9, 1917.

Application filed February 23, 1916. Serial No. 79,831.

*To all whom it may concern:*

Be it known that I, WILLIAM HUMPHREY, a citizen of the United States, and resident of New York, in the county of New York and State of New York, have invented certain new and useful Improvements in Dry-Pipe Valves and Signals, of which the following is a specification.

This invention relates to improvements in valves, and particularly to types used in connection with water sprinkler systems, in which the piping throughout is maintained in a normally dry condition in order to avoid freezing.

The principal object of the invention is to provide a valve of exceedingly simple construction, not readily liable to become disarranged, and in which the manufacturing cost is very low.

A further object is to provide such valves having buoyant signaling devices instantly operative when the valve is actuated, and finally to provide means whereby the valve may be drained, an indicator showing what quantity of water, if any, be above the closing element.

These and other objects are attained by the novel construction and combination of parts hereafter described and shown in the accompanying drawings, and in which:—

Figures 1, 2:
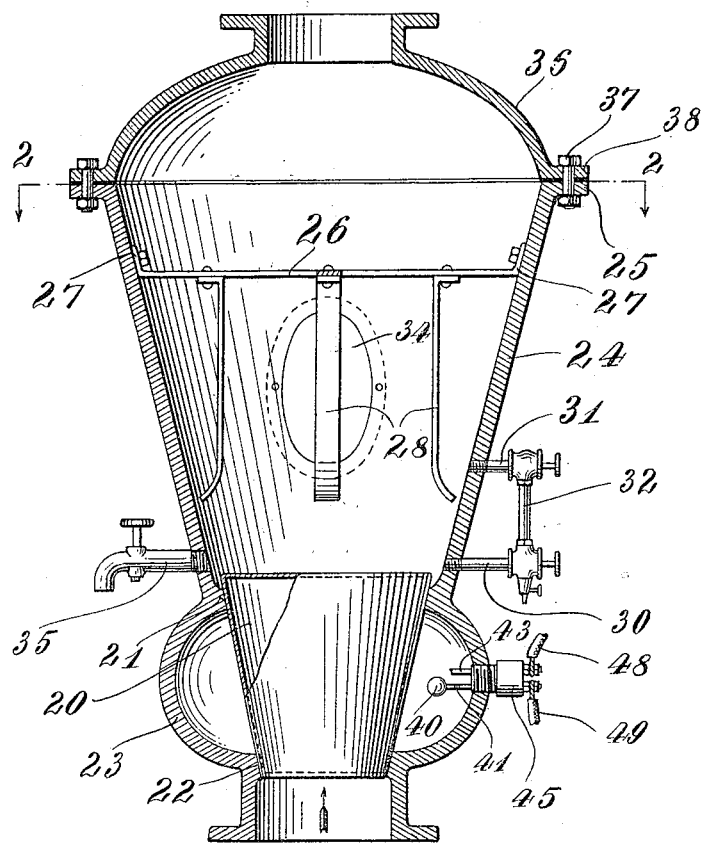
Figure 3:
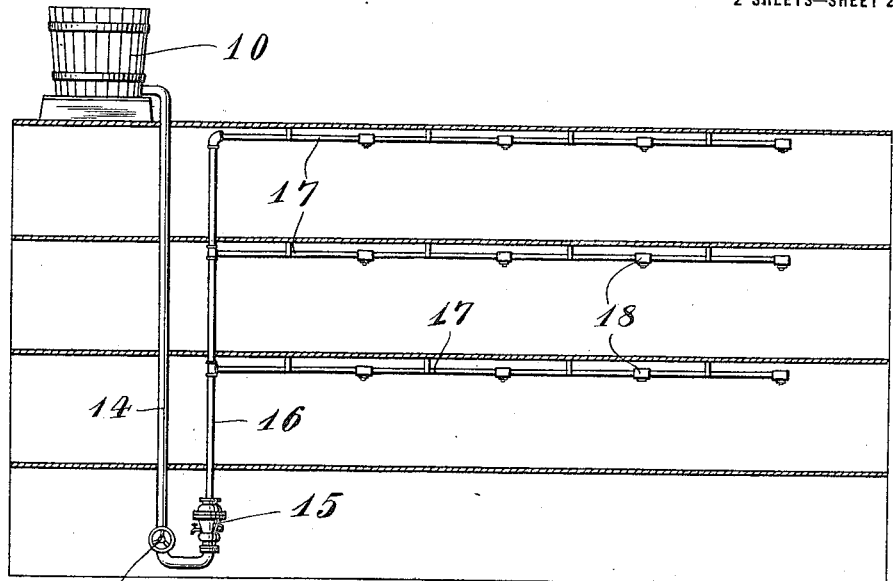
Figure 4:
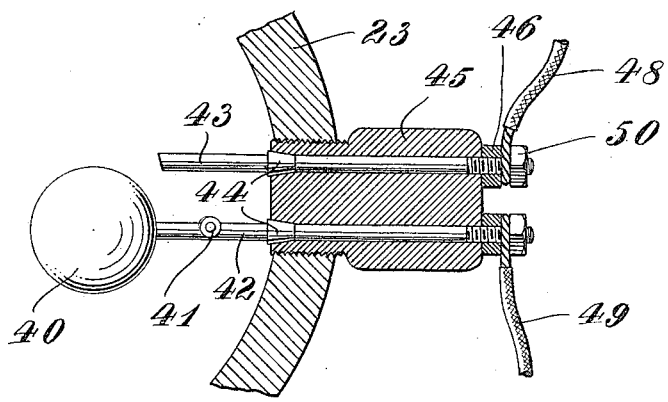
Figure 5:
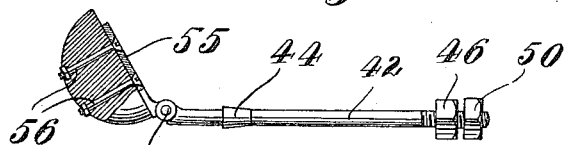

Figure 1 is a vertical sectional view of a dry-pipe valve, made in accordance with the invention, the section being taken substantially on line 1—1 of Fig. 2. Fig. 2 is a transverse sectional view taken on line 2—2 of Fig. 1. Fig. 3 is a diagrammatic representation of a building showing the sprinkler system, and preferable location of the control valves. Fig. 4 is an enlarged sectional view, showing the arrangement of the signaling device, and Fig. 5 is a view showing a modified detail of the same.

In sprinkler systems of this character, it is desirable that the pipes be maintained in a substantially dry condition, in order to avoid corrosion of the parts, and also to eliminate some of the weight which would otherwise be contained therein. Such systems are usually fed by a tank 10, mounted on an elevation sufficiently high to give a desirable pressure, the controlling valve 12 of which is usually maintained in an open condition and placed near the foot of the leader pipe 14, and the dry-pipe valve 15, near the bottom of the riser 16, from which lead off the branches 17, extending throughout the several floors which the tank supplies.

The pipes beyond the dry pipe valve 15 are usually supplied with an air pressure of 30 to 40 pounds per square inch, which causes the plug element 20 to remain engaged with the seats 21 and 22, respectively at the ends thereof, while the flattened spherical chamber 23 contains the actuating elements of an alarm device as hereafter described.

The plug 20, made in accordance with the invention, is conical in shape, and consists of a thin hermetically closed shell or casing, so that the plug is extremely light, and therefore easily operable by the water pressure in the direction indicated by the arrow in Fig. 1.

The chamber 23 is preferably annular in cross section, and above this chamber is a conical casing 24, in which is secured cross bars 26, attached at several points 27, and depending from the bars are vertically disposed guide strips 28, so that the valve may rise therebetween, and be guided in its descent so as to reënter the seats 21 and 22 with certainty.

In the casing, immediately above the seat 21 is one hollow gage support element 30, the other support 31 being positioned higher up, and having therebetween a glass tube 32, so as to show the amount of liquid contained in the lower portion of the valve casing, which can be drained by the cock or similar outlet 35 when necessary.

A cover 36 is connected with the casing 24 by means of bolts 37 passing through the flanges 38 and 25, the latter of which is formed with the casing 24; the cover is provided with a central flanged opening through which the flow may be directed.

Whenever a conflagration should occur, or such amount of heat be transmitted to any of the heads 18, as to cause the same to open, the air obviously will escape therethrough, releasing the pressure on the plug whereupon it will rise, under pressure of the water from the tank, and the water flow through the valve into the riser 16, and eventually out through the head which has been opened. At the same time that the water enters the chamber 23, by reason of the plug rising from its seats, it will fill the chamber and cause the float 40 to turn on its hinged joint 41, formed with the stem 42 and make contact between the exterior of the float and the end of the stem 43, both stems being formed with conical surfaces 44, adapted to tightly fit within the fiber block 45, screw-threaded into the walls of the chamber 23, and held in position by the nuts 46, seated against the outer end of the block and having beyond the nuts 46 the terminals 48 and 49, clamped by the nuts 50, it being understood that the terminals lead to signaling devices not shown.

In Fig. 5 a slightly different form of float is employed, in which the stem 42 is provided with a similar conical enlargement 44, and hinge 41; to the hinge is connected a flat plate 55 held by bolts or rivets 56, to the float proper, which consists in this case of a light material, as cork, so that as the water rises in the chamber 23, it will cause the float to turn upon the hinge and make contact with the upper stem as before described.

From the foregoing it will be seen that an extremely simple dry pipe valve has been indicated in which the cost of construction is far less than that of the present type, while its effectiveness will be fully apparent to one familiar with the state of the art; also that the signaling device is of a simple character, not liable to become disarranged by corrosion or non-use, but always ready to perform its functions.

Having thus described my invention, what I claim as new and desire to secure by Letters Patent, is:—

1. In a dry pipe valve, a flattened globular valve chamber provided with conical seats at the upper and lower ends thereof, a hollow conical valve plug suited to said seats, a casing communicating with said chamber, means in said casing for guiding said plug when raised, means for visually ascertaining the contents of said casing, and means for withdrawing the contents of said casing.

2. In a dry pipe valve, a flattened spherical casing inclosing a valve chamber, said casing having conical seats formed at its upper and lower ends, a hollow conical valve plug fitted to said seats, and adapted to extend therebetween, and guides for said valve plug arranged in said casing whereby said valve plug is held when in a raised position in register with its seats.

Signed at New York, in the county of New York, and State of New York, this 11th day of February, 1916.

WILLIAM HUMPHREY.